United States Patent
Shin et al.

(10) Patent No.: US 11,205,066 B2
(45) Date of Patent: Dec. 21, 2021

(54) POSE RECOGNITION METHOD AND DEVICE

(71) Applicant: SK TELECOM CO., LTD., Seoul (KR)

(72) Inventors: Seung Ho Shin, Seoul (KR); Won Il Chang, Seoul (KR); Gukchan Lim, Seoul (KR); Ikhwan Cho, Seoul (KR); Jinsoo Jeon, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 0 days.

(21) Appl. No.: 16/760,428

(22) PCT Filed: Oct. 31, 2018

(86) PCT No.: PCT/KR2018/013109
§ 371 (c)(1),
(2) Date: Apr. 29, 2020

(87) PCT Pub. No.: WO2019/088697
PCT Pub. Date: May 9, 2019

(65) Prior Publication Data
US 2020/0342218 A1    Oct. 29, 2020

(30) Foreign Application Priority Data
Oct. 31, 2017    (KR) ........................ 10-2017-0143716

(51) Int. Cl.
*G06K 9/00* (2006.01)
*G06T 7/73* (2017.01)
*G06T 7/20* (2017.01)

(52) U.S. Cl.
CPC ............ *G06K 9/00362* (2013.01); *G06T 7/20* (2013.01); *G06T 7/75* (2017.01); *G06T 2207/30196* (2013.01)

(58) Field of Classification Search
CPC .. G06K 9/00362; G06K 9/00; G06K 9/00369; G06T 7/0012; G06T 2207/30196; G06T 7/20; G06T 7/75; G06T 7/70
See application file for complete search history.

(56) References Cited

U.S. PATENT DOCUMENTS

| | | | |
|---|---|---|---|
| 10,679,046 B1 * | 6/2020 | Black | G06T 17/00 |
| 2010/0238168 A1 * | 9/2010 | Kim | G06T 17/00 |
| | | | 345/420 |

(Continued)

FOREIGN PATENT DOCUMENTS

| KR | 10-2010-0104228 A | 9/2010 |
|---|---|---|
| KR | 10-2012-0052669 A | 5/2012 |

(Continued)

OTHER PUBLICATIONS

Real-Time Human Pose Recognition in Parts from Single Depth Images (Year: 2011).*

(Continued)

*Primary Examiner* — Nizar N Sivji
(74) *Attorney, Agent, or Firm* — Hauptman Ham, LLP (57) ABSTRACT

In accordance with an aspect of the present disclosure, there is provided a method for recognizing a pose performed by a pose recognition device. The method comprises, acquiring first position information on a portion and remaining portion of a body part which is a target of pose recognition, inputting the first position information on the remaining portion into a three-dimensional skeleton model, acquiring second position information on the remaining portion of the body part according to a calculation based on anatomical characteristics of the three-dimensional skeleton model, and recognizing the pose of the body part based on the first position information and the second position information.

4 Claims, 3 Drawing Sheets

(56) References Cited

U.S. PATENT DOCUMENTS

| | | | |
|---|---|---|---|
| 2013/0230211 A1* | 9/2013 | Tanabiki | G06T 7/75 |
| | | | 382/103 |
| 2013/0238295 A1* | 9/2013 | Hyung | G06F 30/20 |
| | | | 703/2 |
| 2014/0301605 A1* | 10/2014 | Kawaguchi | G06T 7/251 |
| | | | 382/103 |
| 2014/0334670 A1* | 11/2014 | Guigues | G06K 9/469 |
| | | | 382/103 |
| 2015/0036879 A1* | 2/2015 | Shiozaki | G06T 7/75 |
| | | | 382/103 |
| 2015/0279053 A1* | 10/2015 | Lee | G06T 7/20 |
| | | | 382/107 |
| 2015/0310629 A1* | 10/2015 | Utsunomiya | G06K 9/00348 |
| | | | 382/107 |
| 2017/0193289 A1 | 7/2017 | Karmon et al. | |

FOREIGN PATENT DOCUMENTS

| | | |
|---|---|---|
| KR | 10-1156154 B1 | 6/2012 |
| KR | 10-2014-0114741 A | 9/2014 |
| KR | 20140114741 A * | 9/2014 |
| KR | 10-1662022 B1 | 10/2016 |
| KR | 10-1711736 B1 | 3/2017 |

OTHER PUBLICATIONS

3D Reconstruction of Freely Moving Persons for Re-Identification with a Depth Sensor (Year: 2014).*
Knowledge-based extraction of control skeletons for animation (Year: 2007).*
Space-Time Representation of People Based on 3D Skeletal Data: A Review (Year: 2017).*
Normative 3D opto-electronic stereophotogrammetric posture and spine morphology data in young healthy adult population (Year: 2017).*
A Layered Approach for Robust Spatial Virtual Human Pose Reconstruction Using a Still Image (Year: 2016).*
International Search Report dated Mar. 7, 2019 for corresponding international application No. PCT/KR2018/013109.
Extended European Search Report dated Jun. 9, 2021, corresponding to European Application No. 18874348.8.

* cited by examiner

FIG.1

POSE RECOGNITION METHOD AND DEVICE

CROSS-REFERENCE TO RELATED APPLICATION

The present application is a national stage filing under 35 U.S.C § 371 of PCT application number PCT/KR2018/013109 filed on Oct. 31, 2018 which is based upon and claims the benefit of priorities to Korean Patent Application No. 10-2017-0143716, filed on Oct. 31, 2017, in the Korean Intellectual Property Office. The disclosures of the above-listed applications are hereby incorporated by reference herein in their entireties.

TECHNICAL FIELD

The present disclosure relates to a method of recognizing a pose and a device therefor, and, more particularly, to the method of recognizing the pose of a body part and the device therefor.

BACKGROUND

Active research on NUI (Natural User Interface) technologies interacting between humans and devices is conducted as the devices capable of interacting with the humans, such as computers, smartphones, etc., are widely distributed.

As one of the NUI technologies, an interface utilizing body parts has advantages that allow natural, intuitive interactions without additional apparatuses. Thanks to these advantages, the interface utilizing body parts is widely utilized in fields of HCI (Human-Computer Interaction), HRI (Human-Robot Interaction), and HMI (Human-Machine Interaction), etc., and technologies recognizing a pose of a body part are required for the NUI technologies to adopt the interface utilizing body parts.

The technologies recognizing the pose of the body part as prior arts acquire database regarding poses of the body part in advance, generate a body model to be utilized as reference information by performing machine learning on the acquired database, and recognize the poses of the body part based on similarity between a result of image analysis for the body part and the body model.

However, according to the prior arts, accuracy of pose recognition of the body part does not reach a satisfactory level. Particularly, if a user poses or changes with a fast motion, accuracy of the image analysis decreases and thus occurs a problem that the accuracy of the pose recognition of the body part also decreases.

SUMMARY

According to embodiments of the present disclosure, a pose recognition method and a pose recognition device are provided, the method and the device recognizing a pose of a body part based on a result of image analysis for the body part and position information calculated, through a calculation based on anatomical characteristics of a skeleton, by utilizing position information on a portion of the body part.

In accordance with an aspect of the present disclosure, there is provided a method for recognizing a pose performed by a pose recognition device. The method comprises, acquiring first position information on a portion and remaining portion of a body part which is a target of pose recognition based on analyzing an image of the body part, inputting the first position information on the remaining portion into a three-dimensional skeleton model, the three-dimensional skeleton model capable of expressing physical joint movements by imitating a skeleton of a body, acquiring second position information on the remaining portion of the body part according to a calculation based on anatomical characteristics of the three-dimensional skeleton model, and recognizing the pose of the body part based on the first position information and the second position information, wherein the recognizing the pose of the body part includes, modifying the first position information and the second position information on a portion, of the remaining portion, where the first position information and the second position information are different, based on interpolation of the first position information and the second position information.

In accordance with another aspect of the present disclosure, there is provided a pose recognition device. The pose recognition device comprises, an image acquisition unit configured to acquire an image of a body part which is a target of pose recognition, an image analysis unit configured to acquire first position information on a portion and remaining portion of the body part based on analyzing the image of the body part, a storage unit configured to store a three-dimensional skeleton model capable of expressing physical joint movements by imitating a skeleton of a body, and a control unit, wherein the control unit is configured to, input the first position information into the three-dimensional skeleton model, acquire second position information on the remaining portion of the body part according to a calculation based on anatomical characteristics of the three-dimensional skeleton model, and recognize a pose of the body part based on the first position information and the second position information, and modify the first position information and the second position information on a portion, of the remaining portion, where the first position information and the second position information are different from, based on interpolation of the first position information and the second position information.

According to embodiments of the present disclosure, the pose of the body part is recognized based on the result of image analysis for the image of the body part and the position information calculated, through the calculation based on the anatomical characteristics, by utilizing the position information on the portion of the body part. Therefore, according to the one embodiment of the present disclosure, accuracy of pose recognition improves compared to prior arts recognizing the pose of the body part by utilizing only the result of image analyzing for the body part.

DETAILED DESCRIPTION

Figure 1:
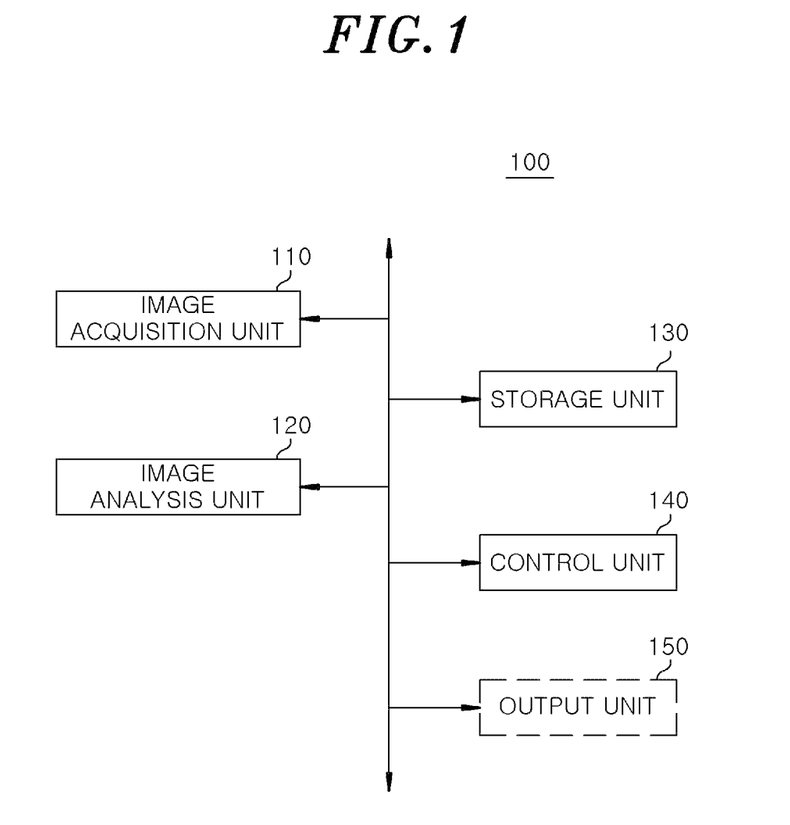
FIG. 1 shows a block diagram of a pose recognition device according to one embodiment of the present disclosure.

FIG. 1 shows a block diagram of a pose recognition device 100 according to one embodiment of the present disclosure.

As illustrated in FIG. 1, the pose recognition device 100 according to the one embodiment includes an image acquisition unit 110, an image analysis unit 120, a storage unit 130, a control unit 140, and an output unit 150.

The image acquisition unit 110 acquires an image of a body part that is a target for pose recognition. The image acquisition unit 110 includes a camera capturing the real world. In this case, the image acquisition unit 110 may directly generate, by utilizing the camera, the image of the body part that is the target for the pose recognition. Otherwise, the image acquisition unit 110 may include a communication interface capable of receiving information from a separate camera from the pose recognition device 100. In this case, image information on the body part that is the target for the pose recognition is generated by the separate camera, and the image acquisition unit 110 may acquire the image information on the body part that is the target for the pose recognition received through the communication interface.

The image analysis unit 120 acquires first position information on a portion of the body part that is the target for the pose recognition by analyzing the image of the body part acquired by the image acquisition unit 110. Further, the image analysis unit 120 may acquire first position information on a remaining portion of the body part that is the target for the pose recognition by analyzing the image of the body part acquired by the image acquisition unit 110. For example, the image analysis unit 120 may include a processor such as a CPU (Central Processing Unit) and the like. For example, the image analysis unit 120 may perform, in advance, machine learning on big data regarding the image of the body part and the first position information on the body part. Hereupon, the image analysis unit 120 may acquire a result of the machine learning as reference information. Further, the image analysis unit 120 may compare changed image information on the body part acquired after a user poses for the image with the pre-acquired reference information to calculate similarity between each other. Furthermore, the image analysis unit 120 may, based on the calculated similarity, recognize the body part and acquire the position information and the first position information. Otherwise, the image analysis unit 120 outputs, through the output unit 150, a GUI (Graphical User Interface) selecting one portion from among body part of the user. Further, the image analysis unit 120 outputs, on the GUI, the image of the body part that is input in real time through the image acquisition unit 110 to allow the user to set an initial state by selecting the one part from among the body part through the GUI. Herein, the image analysis unit 120 may acquire, as the reference information, image information on the body part that is selected for the initial state. Further, the image analysis unit 120 may compare the changed image information on the body part acquired after the user poses for the image with the acquired reference information to calculate the similarity between each other. Hereupon, the image analysis unit 120 may, based on the calculated similarity, recognize the body part and acquire the position information and the first position information.

A three-dimensional skeleton model capable of expressing physical joint movements, by imitating a skeleton of a body, is stored in the storage unit 130. Further, computer executable instructions, when executed by the control unit 140, causing the control unit 140 to perform various processes may be stored in the storage unit 130. Furthermore, results of various processes by the image analysis unit 120 and the control unit 140 may be stored in the storage unit 130. For example, the storage unit 130 may include a computer-readable storage medium that is at least one of a memory which is a flash memory type, a hard disk type, a MMC (Multi-Media Card) micro type, or a card type memory, a RAM (Random Access Memory), and a ROM (Read Only Memory.)

The control unit 140 may perform the various processes by executing the computer executable instructions stored in the storage unit 130. The control unit 140 inputs the first position information on the portion of the body part acquired by the image analysis unit 120 into the three-dimensional skeleton model stored in the storage unit 130. Further, the control unit 140 acquires second position information on the remaining portion of the body part using Inverse Kinematics that is a calculation based on anatomical characteristics of the three-dimensional skeleton model. Furthermore, the control unit 140 recognizes a pose of the body part based on the acquired second position information and the first position information acquired in the image analysis unit 120. In this way, the control unit 140 may acquire the second position information on the remaining portion (apart from the portion) of the body part. Further, for a portion in the remaining portion where the first position information and the second position information are different, the control unit 140 may recognize the pose of the body part by modifying the first position information and the second position information based on interpolation between the first position information and the second position information. In this case, the control unit 140 may adjust an interpolation ratio of the first position information to the second position information to be larger as the similarity used to acquire the first position information (that is, the similarity between the image of the body part and reference information) becomes larger. Further, the control unit 140 may measure or calculate a movement speed of the body part, and the control unit 140 may adjust the interpolation rate of the first position information to the second position information to be smaller as the movement speed becomes faster. For example, the control unit 140 may include a processor such as CPU (Central Processing Unit) and so on.

The output unit 150 may output a result of the pose recognition by the control unit 140. Further, the output unit 150 may output, on a screen, the GUI that is utilized for the image analysis unit 120 to acquire the position information and the first position information. Furthermore, the output unit 150 may output, on the GUI, the image of the body part acquired in real time by the image acquisition unit 110. Since the output unit 150 may be embodied as an extra device apart from the pose recognition device 100, the output unit 150 is illustrated as dotted lines in FIG. 1. For example, the output unit 150 may include a flat panel display component such as LCD (Liquid Crystal Display) and so on.

Figure 2:
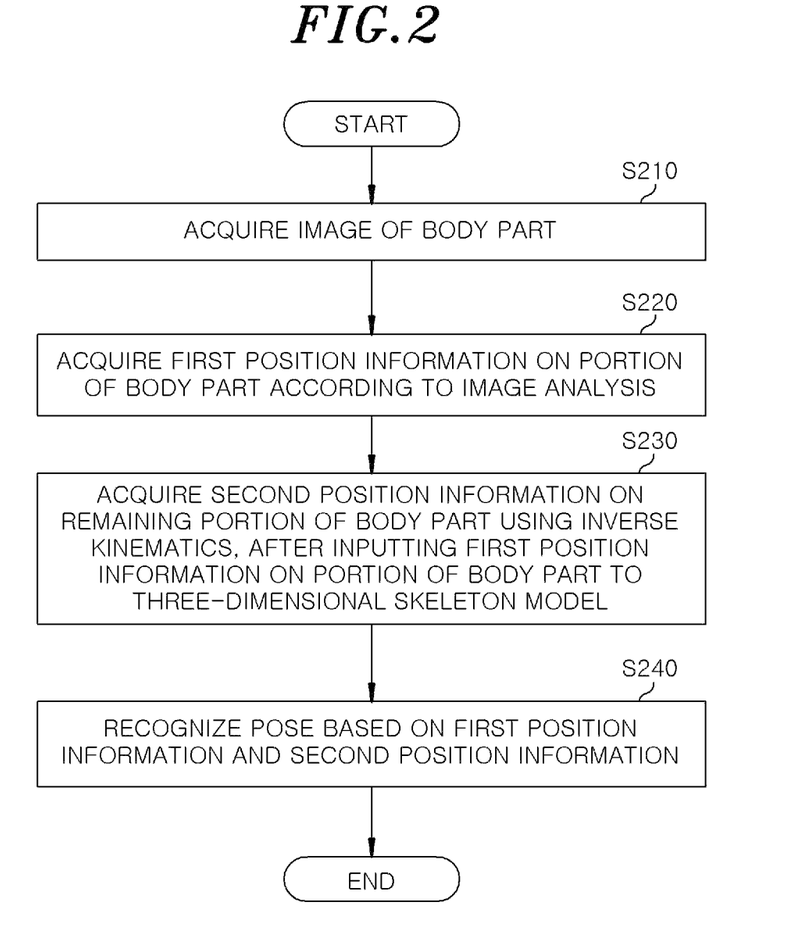
FIG. 2 shows a flowchart illustrating a pose recognition method performed by a pose recognition device according to one embodiment of the present disclosure.

FIG. 2 shows a flowchart illustrating a pose recognition method performed by the pose recognition device 100 according to one embodiment of the present disclosure.

As illustrated in FIG. 2, in a step S210, the pose recognition method according to the one embodiment acquires an image of a body part that is a target for the pose recognition.

Next, in a step S220, the pose recognition method according to the one embodiment acquires first position information on a portion of the body part by analyzing the image of the body part that is the target for the pose recognition.

Next, in a step S230, the pose recognition method according to the one embodiment inputs the first position information on the portion of the body part into a three-dimensional skeleton model (that is capable of expressing physical joint movements by imitating a skeleton of a body) and acquires second position information on a remaining portion of the body part using Inverse Kinematics that is a calculation based on anatomical characteristics of the three-dimensional skeleton model.

Next, in a step S240, the pose recognition method according to the one embodiment recognizes a pose of the body part based on the first position information acquired in the step S220 and the second position information acquired in the step S230.

Hereinafter, the pose recognition method, performed by the pose recognition device 100, according to the one embodiment of the present disclosure is described in more detail referring to FIG. 1 and FIG. 2.

In the first place, in the step S210, the image acquisition unit 110 of the pose recognition device 100 acquires the image of the body part that is the target for the pose recognition. The image acquisition unit 110 may directly generate the image of the body part that is the target for the pose recognition by utilizing a camera. Otherwise, image information of the body part that is the target for the pose recognition may be generated by a separate camera from the pose recognition device 100, and the image acquisition unit 110 may acquire the image information of the body part that is the target for the pose recognition received through a communication interface.

Then, in the step S220, the image analysis unit 120 of the pose recognition device 100 analyzes the image of the body part that is the target for the pose recognition acquired by the image acquisition unit 110 and acquires the first position information on the portion of the body part. For example, the image analysis unit 120 compares the changed image information of the body part acquired after a user poses for the image with reference information, based on a result of machine learning performed in advance, pre-stored in the storage unit 130 and calculates similarity between each other. Further, the image analysis unit 120 may, based on the calculated similarity, recognize the body part and acquire the first position information on the portion of the body part. Otherwise, the image analysis unit 120 outputs, using the output unit 150, a GUI (Graphical User Interface) selecting one portion from among body part of the user. Further, the image analysis unit 120 outputs, on the GUI, the image of the body part that is received in real time from the image acquisition unit 110 to allow the user to set an initial state by selecting the one portion from among the body part through the GUI. Herein, the image analysis unit 120 may acquire, as the reference information, image information on the body part selected for the initial state. Further, the image analysis unit 120 may calculate the similarity between the acquired reference information and the changed image information on the body part acquired after the user poses for the image by comparing each other. Hereupon, the image analysis unit 120 may, based on the calculated similarity, recognize the body part and acquire the first position information on the portion of the body part.

Next, in the step S230, the control unit 140 of the pose recognition device 100 inputs, into the three-dimensional skeleton model pre-stored in the storage unit 130, the first position information on the portion of the body part acquired by the image analysis unit 120. Further, the control unit 140 acquires the second position information on the remaining portion of the body part using Inverse Kinematics that is a calculation based on the anatomical characteristics of the three-dimensional skeleton model. In other words, when the user poses for the image, the image analysis unit 120 may acquire, through image analysis, the first position information on a portion of the body part, such as a wrist, head, a center of a trunk, foot, and so on, and the control unit 140 may acquire, for a movement of the remaining portion of the body part, the second position information on the remaining portion using the Inverse Kinematics, the calculation regarding the anatomical characteristics of the skeleton.

Further, in the step S240, the control unit 140 recognizes the pose of the body part based on the first position information acquired by the image analysis unit 120 and the second position information acquired by the control unit 140.

As previously described, the pose recognition method according to the one embodiment of the present disclosure acquires, for the portion of the body part that is the target for the pose recognition, the first position information according to the image recognition. Further, the pose recognition method acquires, for the remaining portion of the body part, the second position information using the Inverse Kinematics, and the pose of the body part is recognized based on the first position information and the second position information. By comparing the pose recognition method according to the one embodiment of the present disclosure with prior arts, there is a different that the prior arts acquire position information by analyzing an entire body part that is the target for the pose recognition, however, the one embodiment of the present disclosure acquires the position information by analyzing the portion of the body part that is the target for the body part. If the user poses or changes the pose with a fast motion, accuracy of the image analysis declines, however, according to the one embodiment of the present disclosure, accuracy of the pose recognition improves because an amount of the position information corresponding to the declined accuracy of the image analysis is small in comparison with the prior arts.

Figure 3:
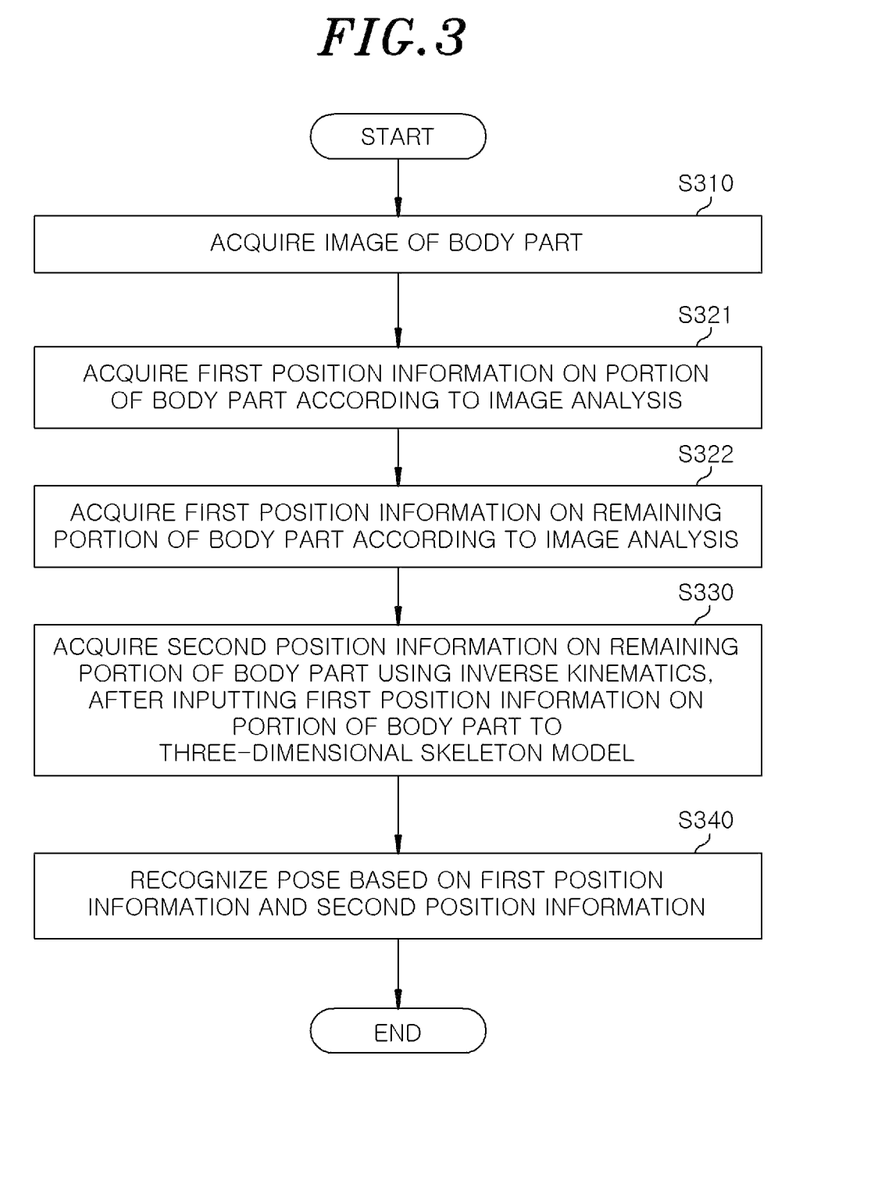
FIG. 3 shows a flowchart illustrating a pose recognition method performed by a pose recognition device according to another embodiment of the present disclosure.

FIG. 3 shows a flowchart illustrating a pose recognition method performed by the pose recognition device 100 according to another embodiment of the present disclosure.

As illustrated in FIG. 3, in a step S310, the pose recognition method according to another embodiment acquires an image of a body part that is a target for pose recognition.

Next, the pose recognition method according to the another embodiment, in a step S321, acquires first position information on a portion of the body part by analyzing the image of the body part that is the target for the pose recognition and, in a step S322, acquires first position information on a remaining portion of the body part by analyzing the image of the body part.

Next, in a step S330, the pose recognition method according to the another embodiment inputs the first position information on the portion of the body part into a three-dimensional skeleton model (that is capable expressing physical joint movements by imitating a skeleton of a body) and acquires second position information on the remaining portion of the body part using Inverse Kinematics that is a calculation based on anatomical characteristics regarding the three-dimensional skeleton model.

Next, in a step S340, the pose recognition method according to the another embodiment recognizes a pose of the body part based on the first position information acquired in the steps S321 and s322 and the second position information acquired in the step S330. Herein, for a portion in the remaining portion (apart from the portion) where the first position information and the second position information are different, the pose recognition method may recognize the pose of the body part by modifying the first position information and the second position information based on interpolation between the first position information and the second position information. In this case, the pose recognition method may adjust an interpolation ratio of the first position information to the second position information to be larger as the similarity used to acquire the first position information (that is, the similarity between the image of the body part and reference information) becomes larger. Further, the pose recognition method may measure or calculate a movement speed of the body part, and the pose recognition method may adjust the interpolation rate of the first position information to the second position information to be smaller as the movement speed becomes faster.

Hereinafter, the pose recognition method, performed by the pose recognition device 100, according to the another embodiment of the present disclosure is described in more detail referring to FIG. 1 and FIG. 3.

In the first place, in the step S310, the image acquisition unit 110 of the pose recognition device 100 acquires the image of the body part that is the target for the pose recognition. The image acquisition unit 110 may directly generate the image of the body part that is the target for the pose recognition by utilizing a camera. Otherwise, image information of the body part that is the target for the pose recognition may be generated by a separate camera from the pose recognition device 100, and the image acquisition unit 110 may acquire the image information of the body part that is the target for the pose recognition received through a communication interface.

Then, in the step S321, the image analysis unit 120 of the pose recognition device 100 analyzes the image of the body part that is the target for the pose recognition acquired by the image acquisition unit 110 and acquires the first position information on the portion of the body part. Further, in the step S322, otherwise the one embodiment described referring to FIG. 2, the image analysis unit 120 acquires the first position information on the remaining portion of the body part that is apart from the portion of the body part by analyzing the image of the body part that is the target for the pose recognition. For example, the image analysis unit 120 calculates similarity between reference information pre-stored in the storage unit 130 based on a result of machine learning performed in advance and changed image information on the body part acquired after the a user poses for the image by comparing each other. Furthermore, based on the calculated similarity, the image analysis unit 120 may recognize the body part, and acquire the first position information. Otherwise, the image analysis unit 120 outputs, through the output unit 150, a GUI (Graphical User Interface) selecting one portion from among body part of the user. Further, the image analysis unit 120 may output, on the GUI, the image of the body part that is received in real time through the image acquisition unit 110 to allow the user to set an initial state by selecting the one portion from among the body part through the GUI. Herein, the image analysis unit 120 may acquire image information on the body part that is selected for the initial state as reference information. Further, the image analysis unit 120 may calculate, by comparing each other, the similarity between changed image information on the body part acquired after the user poses for the image and the acquired reference information. The image analysis unit 120 may, subsequently, based on the calculated similarity, recognize the body part and acquire the first position information.

Next, in the step S330, the control unit 140 of the pose recognition device 100 inputs, into the three-dimensional skeleton model pre-stored in the storage unit 130, the first position information on the portion of the body part acquired by the image analysis unit 120 and acquires the second position information on the remaining portion of the body part using Inverse Kinematics that is a calculation based on anatomical characteristics of the three-dimensional skeleton model. In other words, when the user poses for the image, the image analysis unit 120 may acquire, according to image analysis, the first position information on a portion of the body part, such as a wrist, head, a center of a trunk, foot, and so on, and the control unit 140 may acquire, for a movement of the remaining portion of the body part, the second position information on the remaining portion, with the first position information, using the Inverse Kinematics that is the calculation regarding the anatomical characteristics of the skeleton.

Next, in the step S340, the control unit 140 recognizes the pose of the body part based on the position information and the first position information acquired by the image analysis unit 120 and the second position information acquired by the control unit 140. Herein, for a portion in the remaining portion that is apart from the portion where the first position information and the second position information are different or have a disparity by a predetermined threshold or above, the control unit 140 recognizes the pose of the body part by modifying the first position information and the second position information based on interpolation between the first position information and the second position information. In this case, the control unit 140 may recognize the pose of the body by modifying the first position information and the second position information into a median value if the first position information and the second position information are different. Otherwise, the control unit 140 may recognize the pose of the body part by adjusting an interpolation ratio of the first position information to the second position information to be larger as the similarity used to acquire the first position information (that is, the similarity between the image of the body part and reference information) becomes larger. Otherwise, the control unit 140 may measure or calculate a movement speed of the body part, and the control unit 140 may recognize the pose of the body part by adjusting the interpolation rate of the first position information to the second position information to be smaller as the movement speed becomes faster.

For example, the movement speed of the body part is recognized by calculating changing speed of position information on a particular portion or each portion of the body part. If the user poses or changes the pose with a fast motion, the accuracy of image analysis declines, however, according to the another embodiment of the present disclosure, the accuracy of the pose recognition may improve by depending on the calculation using the Inverse Kinematics compared to the calculation according to the image analysis.

As previously described, the pose recognition method according to the another embodiment of the present disclosure acquires, according to the image analysis for the entire image of the body part that is the target for the pose recognition, the first position information. Further, after acquiring the second position information on the remaining portion apart from the portion of the body part using the Inverse Kinematics, the pose recognition method recognizes the pose of the body part based on the first position information and the second position information. By comparing the pose recognition method according to the another embodiment of the present disclosure with prior arts, there is a different that the prior arts acquire position information only according to image analysis for the entire body part that is the target for the pose recognition, however, the another embodiment of the present disclosure recognizes, for the remaining portion apart from the portion of the body part that is the target for the body part, the pose of the body part based on modifying the first position information and the second position information by the interpolation between the first position information acquired from the image analysis and the second position information acquired using the Inverse Kinematics. Therefore, according to the another embodiment of the present disclosure, the accuracy of recognition for the pose of the body part improves compared to the prior arts.

As previously described, according to the one and the another embodiments, the pose of the body part is recognized based on the result of the image analysis for the body part and the position information calculated using Inverse Kinematics utilizing the position information on the portion of the body part. Therefore, the accuracy of the pose recognition improves compared to the prior arts recognizing the pose of the body by utilizing only the image analysis for the body part.

INDUSTRIAL APPLICABILITY

According to embodiments of the present disclosure, a pose of a body part is recognized based on a result of image analysis for the body part and position information calculated using Inverse Kinematics utilizing position information on a portion of the body part. Therefore, accuracy of pose recognition improves compared to prior arts recognizing the pose of the body by utilizing only the image analysis for the body part.

Pose recognition technologies may be utilized in fields of HCI (Human-Computer Interaction), HRI (Human-Robot Interaction), HMI (Human-Machine Interaction), and so on.

What is claimed is:

1. A method for recognizing a pose performed by a pose recognition device, the method comprising:
   acquiring first position information on both a portion and a remaining portion of a body part which is a target of pose recognition based on analyzing an image of the body part;
   inputting the first position information on the portion into a three-dimensional skeleton model, the three-dimensional skeleton model being capable of expressing physical joint movements by imitating a skeleton of a body;
   acquiring second position information on the remaining portion of the body part according to an inverse kinematic calculation based on anatomical characteristics of the three-dimensional skeleton model; and
   recognizing the pose of the body part based on the first position information and the second position information,
   wherein the recognizing the pose of the body part includes, modifying the first position information and the second position information on a portion, of the remaining portion, where the first position information and the second position information are different, based on interpolation of the first position information and the second position information,
   wherein the first position information is acquired based on similarity between the image of the body part and predetermined reference information, and
   wherein the recognizing the pose of the body part further includes, adjusting an interpolation ratio of the first position information to the second position information to be larger as the similarity becomes larger.

2. The method of claim 1, wherein the recognizing the pose of the body part further includes, measuring a movement speed of the body part; and adjusting an interpolation ratio of the first position information to the second position information to be smaller as the movement speed of the body part becomes faster.

3. A non-transitory computer-readable storage medium including computer executable instructions, wherein the instructions, when executed by a processor, cause the processor to perform a method for recognizing a pose performed by a pose recognition device, the method comprising:
   acquiring first position information on both a portion and a remaining portion of a body part which is a target of pose recognition based on analyzing an image of the body part;
   inputting the first position information on the portion into a three-dimensional skeleton model, the three-dimensional skeleton model being capable of expressing physical joint movements by imitating a skeleton of a body;
   acquiring second position information on the remaining portion of the body part according to an inverse kinematic calculation based on anatomical characteristics of the three-dimensional skeleton model; and
   recognizing the pose of the body part based on the first position information and the second position information,
   wherein the recognizing the pose of the body part includes, modifying the first position information and the second position information on a portion, of the remaining portion, where the first position information and the second position information are different, based on interpolation of the first position information and the second position information,
   wherein the first position information is acquired based on similarity between the image of the body part and predetermined reference information, and
   wherein the recognizing the pose of the body part further includes, adjusting an interpolation ratio of the first position information to the second position information to be larger as the similarity becomes larger.

4. A pose recognition device comprising:
   an image acquisition unit configured to acquire an image of a body part which is a target of pose recognition;
   an image analysis unit configured to acquire first position information on both a portion and a remaining portion of the body part based on analyzing the image of the body part;
   a storage unit configured to store a three-dimensional skeleton model capable of expressing physical joint movements by imitating a skeleton of a body; and
   a control unit,
   wherein the control unit is configured to:
      input the first position information on the portion into the three-dimensional skeleton model;
      acquire second position information on the remaining portion of the body part according to an inverse kinematic calculation based on anatomical characteristics of the three-dimensional skeleton model;
      recognize a pose of the body part based on the first position information and the second position information; and
      modify the first position information and the second position information on a portion, of the remaining portion,
      where the first position information and the second position information are different from, based on interpolation of the first position information and the second position information, wherein the first position information is acquired based on similarity between the image of the body part and predetermined reference information, and wherein the recognizing the pose of the body part further includes, adjusting an interpolation ratio of the first position information to the second position information to be larger as the similarity becomes larger.

\* \* \* \* \*